United States Patent [19]

Banks

[11] 4,340,805

[45] Jul. 20, 1982

[54] WELDING ELECTRODE WITH A FLUORIDE BASED SLAG SYSTEM

[75] Inventor: Kenneth E. Banks, Littlestown, Pa.

[73] Assignee: Chemetron Corporation, Pittsburgh, Pa.

[21] Appl. No.: 197,058

[22] Filed: Oct. 14, 1980

[51] Int. Cl.$^3$ .............................................. B23K 35/30
[52] U.S. Cl. ................................. 219/146.23; 219/74; 219/146.3; 219/146.41
[58] Field of Search ...................... 219/145.22, 146.32, 219/146.41, 146.23, 146.3, 74

[56] References Cited

U.S. PATENT DOCUMENTS

| | | | |
|---|---|---|---|
| Re. 26,549 | 3/1969 | Cary | 219/146.3 X |
| 3,518,404 | 6/1970 | Haar | 219/146.41 X |
| 3,539,765 | 11/1970 | Duttera | 219/146.32 X |
| 3,935,421 | 1/1976 | Ballass | 219/74 X |
| 4,072,845 | 2/1978 | Buckingham | 219/74 X |
| 4,225,773 | 9/1980 | Pokhodnya | 219/145.22 X |
| 4,282,420 | 8/1981 | Banks | 219/146.32 X |

*Primary Examiner*—Richard R. Kucia
*Attorney, Agent, or Firm*—John K. Williamson; William J. O'Rourke, Jr.

[57] ABSTRACT

A gas shielded, flux-cored welding electrode for vertical or overhead welding as well as for horizontal or flat welding is disclosed having a generally tubular metal sheath and a core defined within the sheath, wherein the core includes a slag forming system based, primarily, on about 2–7.5% of the fluorides of calcium and/or strontium.

9 Claims, No Drawings

WELDING ELECTRODE WITH A FLUORIDE BASED SLAG SYSTEM

BRIEF SUMMARY OF THE INVENTION

The present invention is directed to welding electrodes, and more particularly, to gas shielded, flux cored welding electrodes wherein the major slag forming ingredients include the fluorides of calcium and/or strontium.

The prior art such as U.S. Pat. Nos. 3,644,144, 3,868,491, 4,010,309, 4,029,934, 4,109,059 and 4,125,758, disclose a variety of welding electrode compositions and a plurality of slag systems. Such references teach that a core within a steel sheath of an electrode may contain deoxidizers, alloys, gas forming ingredients, slag forming ingredients, arc stabilizers and various metallic powders as may be required for certain welding applications.

A commercially acceptable flux-cored continuous welding electrode is disclosed in U.S. Pat. No. 3,051,822. Such electrode is employed in a welding process which utilizes a dual principal for shielding the welding operation. In particular, a slag is formed during welding to shield the molten weld metal, and a gas is used simultaneously to shield the arc column. An improved welding electrode, particularly adapted for use in vertical, or other out-of-position welding is disclosed in U.S. Pat. No. 3,800,120. The slag system employed in these contemporary, gas shielded, flux-cored electrodes are based, primarily, on titanium dioxide.

It appears that welds deposited with an electrode having a titanium dioxide based slag system may, in certain applications, pick up titanium that has been reduced from the slag at the high arc temperatures experienced during welding. It has been found that such titanium may be detrimental to the notch toughness of a weld in the aswelded and in the stress relieved condition.

Accordingly, an alternative welding electrode is desired to permit out-of-position, or vertical welding as well as horizontal welding, having a slag system which is not based on titanium dioxide which may adversely affect the notch toughness of a weld in certain applications.

The present invention may be summarized as providing a new and improved welding electrode for vertical or overhead welding, as well as for horizontal welding, having a generally tubular ferrous metal sheath and a core defined within the sheath. The core of the electrode of the present invention includes from about 2.0 to 7.5% calcium fluoride and/or strontium fluoride as the major slag forming ingredient.

An objective of the present invention is to provide an electrode for out-of-position welding as an alternative to a titanium dioxide slag based out-of-position electrode.

An advantage of the fluoride based slag system in the core of the electrode of the present invention is the elimination of titanium which could be picked up by the weld metal and may be detrimental, in certain applications, to the notch toughness of such weld.

A further objective of the present invention is to provide an electrode with a particular slag system that minimizes impurities in the deposited weld metal.

A unique advantage of the present invention is that a particular fluoride based slag system provides an electrode which can be successfully employed in vertical, overhead, and other nonhorizontal positions. What is unique about this advantage is that fluorides have been conventionally thought to produce a weld which is too fluid to be applied in positions other than flat, and that fluorides in electrodes are known to produce arcs which normally lack the drive necessary to prevent slag entrapment. The particular fluoride based core composition of the electrode of the present invention produces the drive and the viscosity necessary for out-of-position applications.

These and other objectives and advantages of this invention will be more fully understood and appreciated with reference to the following description.

DETAILED DESCRIPTION

The electrode of the present invention includes a generally tubular ferrous metal sheath. The sheath is formed of the metal to be consumed and transferred to the weld. In a preferred embodiment the electrode sheath may be formed from cold rolled strip material. Such strip material may be formed into an intermediate semicircular shape. While the strip is in such semicircular configuration, the core materials, preferably homogeneously mixed together, may be poured therein. Then, the strip or sheath, is closed about the core materials. Where desired, the electrode may be drawn or rolled to sizes smaller than the originally formed electrode. It will be understood that such forming and drawing operations have the effect of compressing the core materials and eliminating any void spaces throughout the length of the electrode.

The core of the electrode of the present invention comprises a mixture of slag forming ingredients, deoxidizers and alloying ingredients. Additionally, weld metal powder, such as iron powder, may also be added to the core of the flux cored electrode of the present invention.

The slag forming ingredients in the core of the electrode include from about 2.0 to about 7.5 percent fluorides selected from the group consisting of calcium fluoride, strontium fluoride and mixtures of calcium fluoride and strontium fluoride. The percentages stated herein are based on the total electrode weight unless specified to the contrary. In a preferred embodiment a mixture of calcium fluoride and strontium fluoride is utilized in the core of the electrode, and the quantity of strontium fluoride is from about 0.80% to about 1.50% of the total electrode weight, and calcium fluoride is utilized to provide a calcium fluoride to strontium fluoride ratio of about 5 to 3. It will be appreciated by those skilled in the art that the fluorides of calcium and/or strontium, which comprise the primary slag forming ingredients, contribute to the cleanliness of a weld deposit through their shielding and fluxing mechanisms. The slag formed when utilizing the fluoride based slag system of the present invention increases the slag viscosity to yield significantly uniform coverage protection from the atmosphere and to assist in supporting the molten metal, especially in other than horizontal positions, during metal solidification. The higher viscosity also raises the melting point of the flux materials in the case of the electrode of the present invention.

It has been found that insufficient shielding results during welding if less than about 2% fluoride is used in the slag system of the present invention. Also, it appears that about 7.5% fluoride is the maximum quantity that may be present in the slag system of the present invention when employing a butt tube configuration. This fluoride limitation is due, primarily, to such electrode tube design limitations. It should be understood that an electrode having a lap tube configuration would allow up to about double such amount of fluoride, i.e., up to 15.0% fluoride, and a similar proportional increase in the amount of other ingredients in the slag system. Lap tube configurations, however, are not usually considered desirable because the thin gage strip employed in lap tube designs is less ductile and, therefore, limits the amount of reduction that can be achieved when such electrodes are drawn to their final diameter.

Other slag forming ingredients in the core of the electrode of the present invention may include silicates of calcium and/or sodium in the range of less than about 1.0 percent. The silicates are utilized primarily to control the viscosity and surface tension of the slag formed during welding.

To improve the wetting action of the electrodes iron oxides, up to about 1.0 percent, may be included as a slag forming ingredient. Wetting action is the quality of forming a low surface tension contact between the base metal and the weld metal. It is generally known that an oxide layer on the surface may reduce the wetting tendency. An electrode having a reducing flux system should increase wetting and reduce surface tension by removing this oxide layer. Also, manganese oxides which may be present up to about 2.75 percent, may be used as a slag forming ingredient in the electrode core. The oxides of manganese may be used not only to improve the wetting action but also to control the viscosity and surface tension of the slag.

It will be understood that the slag forming ingredients may be used as a mechanical mixture. Also, in instances where core space may be critical, all or part of the slag forming ingredients may be condensed by prefusing, or reduced to a synthesized slag prior to use. Prefusing may reduce the volume of the slag forming ingredients in excess of 75%.

Deoxidizers and alloying ingredients used in the core of the flux-cored electrode of the present invention may include from about 0.3 to 1.0% silicon, from about 0.5 to 1.5% manganese, and from about 0.3 to 1.0% magnesium. The silicon and manganese may be added to the core in a combined form such as ferrosilicon, ferromanganese, ferromanganese-silicon, calcium silicate, and the like. In certain applications, calcium silicide may be preferred because of its increase in basicity, and because of its tendency to stabilize the arc to a small degree during welding with such electrode. The magnesium in the core desulfurizes the weld deposit by refining the molten metal, and contributes to the out-of-position capabilities of the electrode by the formation of magnesium oxide in the arc during welding, thereby increasing the melting point and the viscosity of the formed slag.

The balance, or remainder, of the core consists of alloy powder selected from the group consisting of nickel, chromium, molybdenum, iron and mixtures thereof. Nickel, chromium and molybdenum may be added to produce low alloy weld deposits similar to those produced with prior art, rutile based, flux-cored electrodes.

An electrode with a core as described above may be successfully utilized for vertical, or other out-of-position welding, as well as for horizontal welding. Further, welds formed with the use of the electrodes do not contain amounts of titanium or other impurities which, in certain instances, may adversely affect the notch toughness of a weld. It will be apparent to those skilled in the art that the electrode of the present invention may be particularly advantageous for welding alloys which have low phosphorus and low sulfur requirements.

Table I below sets forth the chemical composition of three exemplary electrodes of the present invention.

TABLE I

| | Composition | | | |
|---|---|---|---|---|
| | Amount (percent of the total weight of the electrodes) | | | |
| Constituents | Example 1 | Example 2 | Example 3 | Example 4 |
| $CaF_2$ | 4.4 | 4.4 | 4.4 | 2.2 |
| MnO | 0.3 | 0.3 | 0.3 | 0.3 |
| FeO | 0.0 | 0.0 | 0.99 | 0.3 |
| $Na_2CO_3$ | 0.06 | 0.06 | 0.0 | 0.0 |
| $Na_2SiO_3$ | 0.17 | 0.0 | 0.0 | 0.13 |
| $CaSiO_3$ | 0.39 | 0.06 | 0.06 | 0.4 |
| Si | 0.99 | 0.79 | 0.92 | 1.0 |
| Mn | 0.83 | 0.83 | 0.77 | 0.8 |
| Mg | 0.77 | 0.99 | 0.77 | 0.8 |
| $SrF_2$ | — | — | — | 2.2 |
| Fe | Remainder | Remainder | Remainder | Remainder |

The physical properties of the welds deposited with the electrodes of the above compositions are as follows:

| Weld Deposit Chemistries | Example 1 | Example 2 | Example 3 | Example 4 |
|---|---|---|---|---|
| carbon | .080 | .088 | .058 | .064 |
| manganese | 1.28 | 1.38 | 1.31 | 1.40 |
| silicon | 0.68 | .53 | .65 | .73 |
| phosphorus | .006 | .006 | .006 | .004 |
| sulfur | .012 | .011 | .012 | .013 |
| Welding Position | Vertical-Up | Vertical-Up | Vertical-Up | Vertical-Up |
| Shielding Gas | $CO_2$ | $CO_2$ | $CO_2$ | $CO_2$ |
| Heat | Ex. 1 | Ex. 2 | Ex. 3 | Ex. 4 |
| Treatment | As Welded | Stress Relieved* | As Welded | As Welded | As Welded |
| Strength | | | | |
| Tensile (ksi) | 85.8 | 77.5 | 83.3 | 84.6 | 78.8 |
| Yield (ksi) | 74.8 | 56.5 | 68.1 | 68.2 | 59.3 |
| Elongation (%) | 23 | 32 | 29 | 28 | 32 |

*Stress relieved 8 Hr. @ 1150° F.

Electrodes, or wires, having a slag forming system as described herein also have the potential for exhibiting impact properties which are significantly improved over the impact properties of conventional acid slag welding electrodes.

What is believed to be the best mode of this invention has been described above. It will be apparent to those skilled in the art that numerous variations of the illustrated details may be made without departing from this invention.

What is claimed is:

1. A welding electrode having a generally tubular ferrous metal sheath, and a core defined within the sheath for use in gas shield welding wherein the shielding gas is selected from the group consisting of carbon dioxide, inert gas, oxygen and inert gas mixtures, and mixtures thereof, comprising, by total weight of the electrode, from about 2.0 to 7.5% fluorides selected from the group consisting of calcium fluoride, strontium fluoride and mixtures thereof, up to about 1.0% silcates selected from the group consisting of calcium silcate, sodium silicate and mixtures thereof,
less than about 1.0% iron oxide,
less than about 2.75% manganese oxide,
from about 0.3 to 1.0% silicon,
from about 0.5 to 1.5% manganese,
from about 0.3 to 1.0% magnesium, and
the balance consisting of an alloy powder selected from the group consisting of nickel, chrome, molybdenum, iron and mixtures thereof.

2. A welding electrode as set forth in claim 1 wherein the core comprises from about 2.0 to 7.2% calcium fluoride.

3. A welding electrode as set forth in claim 1 wherein the core comprises from about 2.0 to 5.0% calcium fluoride.

4. A welding electrode as set forth in claim 1 wherein the core comprises from about 2.0 to 7.2% strontium fluoride.

5. A welding electrode as set forth in claim 1 wherein the core comprises from about 2.0 to 5.0% strontium fluoride.

6. A welding electrode as set forth in claim 1 wherein the core comprises from about 0.80 to about 1.50% strontium fluoride and sufficient calcium fluoride to provide a calcium fluoride to strontium fluoride ratio of about 5 to 3.

7. A welding electrode as set forth in claim 1 wherein the slag forming core materials are prefused.

8. A welding electrode as set forth in claim 1 wherein the silicon is present in the core in a combined form selected from the group consisting of ferrosilicon, ferromanganese-silicon, calcium silicate and calcium silicide.

9. A welding electrode as set forth in claim 1 wherein the manganese is present in the core in a combined form selected from the group consisting of ferromanganese and ferromanganese-silicon.

* * * * *